US008164849B1

(12) United States Patent
Szeremeta et al.

(10) Patent No.: US 8,164,849 B1
(45) Date of Patent: Apr. 24, 2012

(54) INFORMATION STORAGE DEVICE WITH A CONDUCTIVE SHIELD HAVING FREE AND FORCED HEAT CONVECTION CONFIGURATIONS

(75) Inventors: Wally Szeremeta, Mission Viejo, CA (US); Bruce A. Cariker, Diamond Bar, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 777 days.

(21) Appl. No.: 12/201,460

(22) Filed: Aug. 29, 2008

Related U.S. Application Data

(63) Continuation-in-part of application No. 11/953,782, filed on Dec. 10, 2007, now Pat. No. 7,701,705.

(51) Int. Cl.
G11B 33/14 (2006.01)
(52) U.S. Cl. ..................................... 360/97.02
(58) Field of Classification Search ..... 360/97.01–97.04
See application file for complete search history.

(56) References Cited

U.S. PATENT DOCUMENTS

| | | |
|---|---|---|
| 4,713,714 A | 12/1987 | Gatti et al. |
| 4,831,476 A | 5/1989 | Branc et al. |
| 5,041,924 A | 8/1991 | Blackborow et al. |
| 5,062,016 A | 10/1991 | Zupancic |
| 5,067,041 A | 11/1991 | Cooke et al. |
| 5,124,855 A | 6/1992 | Dew et al. |
| 5,216,582 A | 6/1993 | Russell et al. |
| 5,223,996 A | 6/1993 | Read et al. |
| 5,243,495 A | 9/1993 | Read et al. |
| 5,349,486 A | 9/1994 | Sugimoto et al. |
| 5,463,527 A | 10/1995 | Hager et al. |
| 5,511,055 A | 4/1996 | Otsuki et al. |
| 5,586,893 A | 12/1996 | Mosquera |
| 5,654,875 A | 8/1997 | Lawson |
| 5,694,267 A | 12/1997 | Morehouse et al. |
| 5,777,821 A | 7/1998 | Pottebaum |
| 5,870,247 A | 2/1999 | Schirle |
| 6,018,125 A | 1/2000 | Collins et al. |
| 6,147,834 A | 11/2000 | Srikrishna et al. |
| 6,185,097 B1 | 2/2001 | Behl |
| 6,252,770 B1 | 6/2001 | Yu et al. |
| 6,275,352 B1 | 8/2001 | Tadepalli et al. |
| 6,285,545 B1 | 9/2001 | Lopez |
| 6,292,373 B1 | 9/2001 | Li et al. |
| 6,319,026 B1 | 11/2001 | Chen et al. |
| 6,354,875 B1 | 3/2002 | Wu |
| 6,407,913 B1 | 6/2002 | Peachey et al. |
| 6,411,522 B1 | 6/2002 | Frank, Jr. et al. |

(Continued)

OTHER PUBLICATIONS

Serial ATA; from Wikipedia, excerpted Nov. 1, 2011, 17 pages.*

(Continued)

*Primary Examiner* — Allen Heinz

(57) ABSTRACT

A novel information storage device has a disk drive, a disk drive support structure adapted to maintain the disk drive base in a substantially vertical position, and an electrically conductive shield attached to the disk drive base. The electrically conductive shield is disposed adjacent and overlying the disk drive printed circuit board. The electrically conductive shield includes a fan mounting surface having a fan duct opening disposed adjacent an upper end of the electrically conductive shield, and a lower air inlet opening disposed adjacent a lower end of the electrically conductive shield. The information storage device includes no fan and no fan is attached to the fan mounting surface. The electrically conductive shield forms a continuous internal air passageway from the lower air inlet opening to the fan duct opening.

10 Claims, 8 Drawing Sheets

U.S. PATENT DOCUMENTS

| | | | |
|---|---|---|---|
| 6,437,980 B1 | 8/2002 | Casebolt | |
| 6,462,958 B2 | 10/2002 | Ogata | |
| 6,480,380 B1 | 11/2002 | French et al. | |
| 6,487,039 B1 | 11/2002 | Bernett | |
| 6,498,722 B1 | 12/2002 | Stolz et al. | |
| 6,535,384 B2 | 3/2003 | Huang | |
| 6,538,886 B2 | 3/2003 | Yu | |
| 6,561,836 B1 | 5/2003 | Marshall et al. | |
| 6,567,265 B1 | 5/2003 | Yamamura et al. | |
| 6,567,360 B1 | 5/2003 | Kagawa | |
| 6,593,673 B1 | 7/2003 | Sugai et al. | |
| 6,618,246 B2 | 9/2003 | Sullivan et al. | |
| 6,621,693 B1 * | 9/2003 | Potter et al. | 361/679.33 |
| 6,621,717 B2 | 9/2003 | Tuttle et al. | |
| 6,661,651 B1 | 12/2003 | Tanzer et al. | |
| 6,661,677 B1 | 12/2003 | Rumney | |
| 6,735,080 B1 | 5/2004 | Chang | |
| 6,751,092 B1 | 6/2004 | Ohnishi et al. | |
| 6,752,654 B1 | 6/2004 | Huang et al. | |
| 6,758,685 B1 | 7/2004 | Huang et al. | |
| 6,761,580 B2 | 7/2004 | Chang | |
| 6,781,826 B1 | 8/2004 | Goldstone et al. | |
| 6,790,066 B1 | 9/2004 | Klein | |
| 6,811,427 B2 | 11/2004 | Garrett et al. | |
| 6,843,674 B1 | 1/2005 | Young | |
| 6,958,884 B1 | 10/2005 | Ojeda et al. | |
| D512,422 S | 12/2005 | Sato et al. | |
| 7,035,097 B2 | 4/2006 | Petrov et al. | |
| D521,935 S | 5/2006 | Lai | |
| D521,936 S | 5/2006 | Novotney et al. | |
| D538,233 S | 3/2007 | Wan et al. | |
| 7,187,543 B2 | 3/2007 | Zimlin | |
| 7,211,739 B1 | 5/2007 | Brigham, Jr. et al. | |
| 7,271,978 B1 | 9/2007 | Santini et al. | |
| 7,298,583 B2 | 11/2007 | Miyazaki et al. | |
| 7,307,843 B2 | 12/2007 | Harman et al. | |
| 7,701,705 B1 | 4/2010 | Szeremeta | |
| 2003/0206402 A1 | 11/2003 | Tsuyuki et al. | |
| 2004/0255313 A1 | 12/2004 | Kaczeus, Sr. et al. | |
| 2005/0030712 A1 | 2/2005 | Faneuf et al. | |
| 2005/0063155 A1 | 3/2005 | Endo et al. | |
| 2005/0088778 A1 | 4/2005 | Chen et al. | |
| 2005/0185326 A1 | 8/2005 | Bruner et al. | |
| 2005/0205279 A1 | 9/2005 | Cochrane | |
| 2005/0215084 A1 | 9/2005 | Ho et al. | |
| 2006/0002005 A1 | 1/2006 | Miyazaki et al. | |
| 2006/0158775 A1 | 7/2006 | Sega et al. | |
| 2006/0289191 A1 | 12/2006 | Yamashita | |
| 2007/0091567 A1 | 4/2007 | Hayashi | |
| 2007/0149029 A1 | 6/2007 | Hwang | |
| 2008/0165489 A1 | 7/2008 | Ho et al. | |

OTHER PUBLICATIONS

Office Action dated Mar. 24, 2009 from U.S. Appl. No. 11/953,782, 6 pages.

Office Action dated Jun. 11, 2009 from U.S. Appl. No. 11/953,782, 20 pages.

Office Action dated Dec. 14, 2009 from U.S. Appl. No. 11/953,782, 8 pages.

Peter A. Masterson, "Isolation Techniques for 2.5-Inch Hard Disk Drives", www.earshockandvibe.conn/pdfs/engineering/2.5HDD.pdf, downloaded on Dec. 10, 2007, 4 pages.

3M Mini Serial Attached SCSI (miniSAS) Connector, 8A26/8C26 Series, Sep. 2007, TS-2211-B, 9 pages.

3M Mini Serial Attached SCSI (miniSAS) Connector/Shell, 8A36/8B36 Series, Feb. 2007, TS-2219-01, 7 pages.

* cited by examiner

INFORMATION STORAGE DEVICE WITH A CONDUCTIVE SHIELD HAVING FREE AND FORCED HEAT CONVECTION CONFIGURATIONS

CROSS-REFERENCE TO RELATED APPLICATION

This application is a continuation in part of U.S. application Ser. No. 11/953,782, filed on Dec. 10, 2007, which issued as U.S. Pat. No. 7,701,705 on Apr. 20, 2010.

FIELD OF THE INVENTION

The present invention relates generally to the field of information storage devices, and more particularly to mounting systems and housings for information storage devices.

BACKGROUND

Information storage devices are used to retrieve and/or store data for computer systems and other consumer electronics products. Information storage devices such as magnetic hard disk drives are sensitive to their external environment, including mechanical shocks, externally applied forces and electromagnetic fields, contamination, changes in temperature and/or humidity, etc. Therefore, an information storage device's housing and mounting system may affect its performance, reliability, and lifetime.

Many information storage devices are housed within the system for which they retrieve and/or store data. For example, so-called "internal" disk drives are housed within a host computer system for which they store data, and therefore internal disk drives may take advantage of the host computer system for electrical power, electromagnetic shielding, convective and/or conductive cooling, vibration dampening, some degree of isolation from external mechanical shocks, etc.

Other information storage devices are not housed within the system for which they retrieve and/or store data. For example, a so-called "external" hard disk drive includes its own housing, which may provide electromagnetic shielding, vibration dampening, some degree of isolation from external mechanical shocks, and a means for cooling.

The amount of heat that must be dissipated by an external hard disk drive housing depends upon several design factors. For example, if the disk rotation speed is chosen to be higher, then more heat will be generated by the spindle motor of the disk drive (for a given disk diameter and number of disks). Also, if more disks are mounted on the spindle motor hub, then more heat will be generated by the spindle motor of the disk drive (for a given disk diameter and disk rotation speed). Therefore, for a specified disk drive design, more heat will be generated by a fully populated variant of that design than by a depopulated variant of that design (e.g. where some of the disks are deliberately absent).

In either case, it would be disadvantageous to include unnecessary (or more than necessary) components and structures to accomplish heat dissipation, because the mounting systems and housings for modern information storage devices must also meet challenging space and cost requirements. For example, an external disk drive housing that is designed to provide adequate cooling for a disk drive that generates relatively greater heat is likely to be excessively expensive and bulky for a disk drive that generates relatively less heat. Therefore, the utility of conventional external disk drive housings has been practically limited to a narrow range of disk drive designs.

SUMMARY

A novel information storage device having a disk drive is disclosed and claimed. The disk drive includes a disk drive base with a first side and an opposing second side, a spindle attached to the disk drive base, a disk attached to the spindle, a disk drive cover attached to the first side of the disk drive base to enclose the spindle and the disk, and a disk drive printed circuit board attached to the disk drive base and disposed adjacent the second side of the disk drive base. The information storage device also includes a disk drive support structure adapted to maintain the second side of the disk drive base in a substantially vertical position, and an electrically conductive shield attached to the disk drive base. The electrically conductive shield is disposed adjacent the second side of the disk drive base and overlies the disk drive printed circuit board. The electrically conductive shield includes a fan mounting surface having a fan duct opening disposed adjacent an upper end of the electrically conductive shield, and a lower air inlet opening disposed adjacent a lower end of the electrically conductive shield. The information storage device includes no fan and no fan is attached to the fan mounting surface. The electrically conductive shield forms a continuous internal air passageway from the lower air inlet opening to the fan duct opening, between the electrically conductive shield and the second side of the disk drive base.

DETAILED DESCRIPTION OF EXEMPLARY EMBODIMENTS

Figure 1:
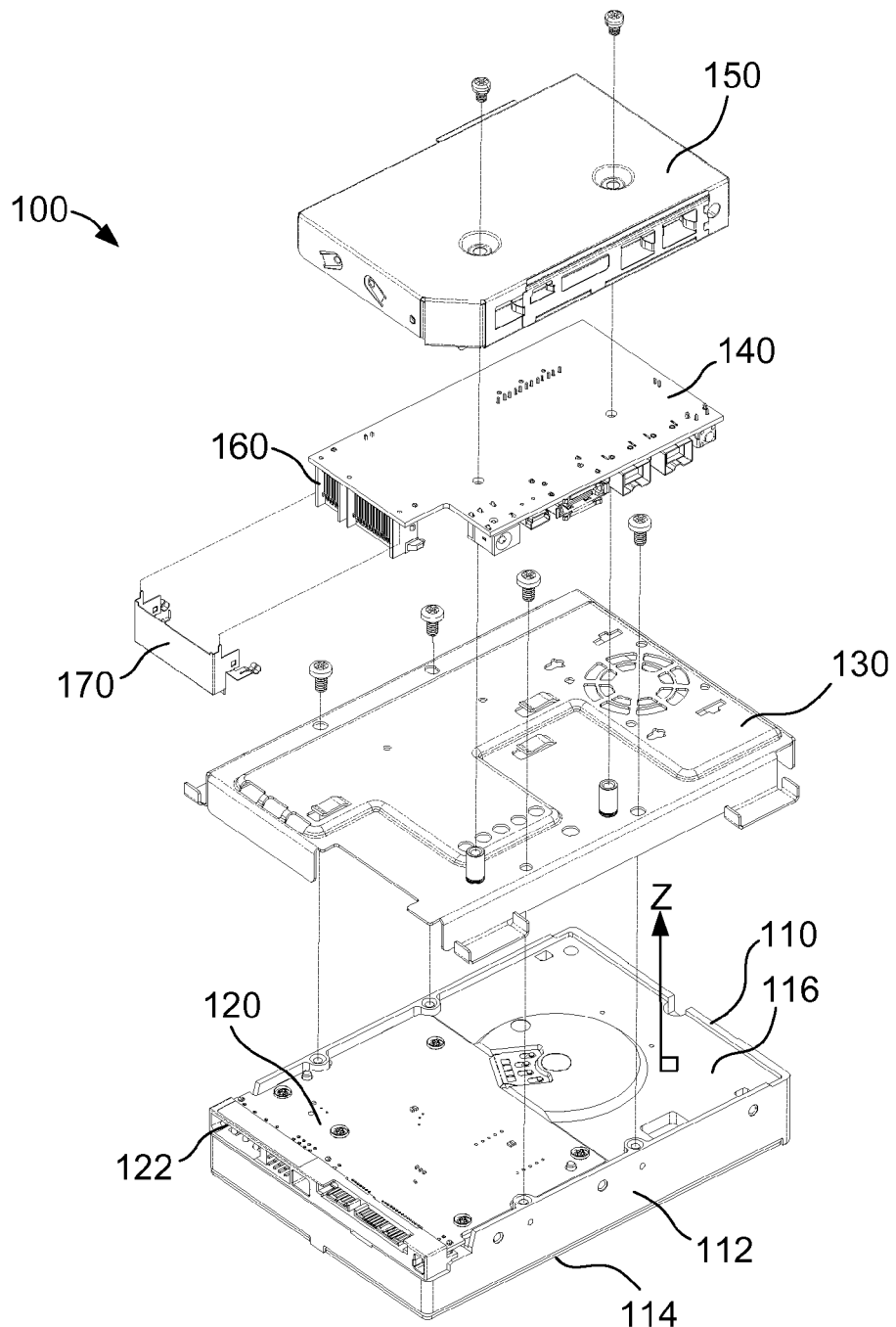
FIG. 1 is an exploded perspective view of an information storage device according to an embodiment of the present invention.

FIG. 1 is an exploded perspective view of an information storage device 100 according to an embodiment of the present invention. The information storage device 100 includes a disk drive 110 including a disk drive base 112 that has a first side 114 and an opposing second side 116. The disk drive 110 includes a spindle that is attached to the disk drive base 112, with at least one disk attached to the spindle (the disk and spindle are not visible in FIG. 1 because they are interior to the disk drive 110). A disk drive cover is attached to the first side 114 of the disk drive base 112 to enclose the spindle and the disk. Only a side edge of the cover is visible in FIG. 1 because of the viewing angle.

A disk drive printed circuit board 120 is attached to the disk drive base 112 and is disposed adjacent the second side 116 of the disk drive base 112. The disk drive printed circuit board 120 may include disk drive controller circuitry to control the rotation of a spindle motor within the disk drive 110 and the motion of an actuator within the disk drive 110. The disk drive printed circuit board 120 includes a disk drive printed circuit board connector 122.

An electrically conductive shield 130 is disposed adjacent the second side 116 of the disk drive base 110 and is attached to the disk drive base 110. The electrically conductive shield 130 at least partially overlies the disk drive printed circuit board 120, and preferably covers the disk drive printed circuit board 120 so as to substantially shield the disk drive printed circuit board 120 from electromagnetic noise. In this sense, overlying does not require or imply a relative position with respect to the direction of gravity. Rather, the electrically conductive shield 130 overlies the disk drive printed circuit board 120 simply in the sense that at least a portion of the disk drive printed circuit board 120 is between the electrically conductive shield 130 and the second side 116 of the disk drive base 112. To reduce manufacturing costs, the first conductive shield 130 is preferably fabricated from sheet metal.

The disk drive 110 may be of various form factors. For example, disk drive 110 may be a 3.5" form-factor disk drive or a 2.5" form factor disk drive. The size of the disk drive printed circuit board 120 and of the disk drive 110 may affect various aspects of the design of the conductive shield 130. For example, the conductive shield 130 is preferably large enough to substantially cover the disk drive printed circuit board 120 to provide adequate electromagnetic shielding. Also for example, the thickness of sheet metal from which the conductive shield 130 may be fabricated, may be scaled according to disk drive form factor. For example, in the embodiment of FIG. 1, if the disk drive 110 is a 3.5" form-factor magnetic hard disk drive, then a corresponding sheet metal thickness is preferably in the range 0.8 mm to 1.6 mm. Also for example, if the disk drive 110 is a 2.5" form-factor magnetic hard disk drive, then a corresponding sheet metal thickness is preferably in the range 0.4 mm to 1.2 mm.

The information storage device 100 of FIG. 1 also includes a bridge controller printed circuit board 140 and a conductive bridge controller enclosure 150 over and electrically coupled to the bridge controller printed circuit board 140. The bridge controller printed circuit board 140 may be, for example, a Serial Advanced Technology Attachment (SATA) or an Enhanced Serial Advanced Technology Attachment (eSATA) controller printed circuit board that includes circuitry to control a SATA or eSATA interface. The bridge controller printed circuit board 140 may, for example, enable the information storage device 100 to transfer data to/from a separate computer system over a Universal Serial Bus (USB) connection or a IEEE 1394 connection.

In the embodiment of FIG. 1, a disk drive interface connector 160 electrically couples the bridge controller printed circuit board 140 with the disk drive printed circuit board 120. For example, the disk drive interface connector 160 may be a high-rise SATA connector. In the embodiment of FIG. 1, a connector shield 170 is attached to the disk drive interface connector 160 and, after assembly, contacts both the conductive shield 130 and bridge controller enclosure 150.

Figure 2:
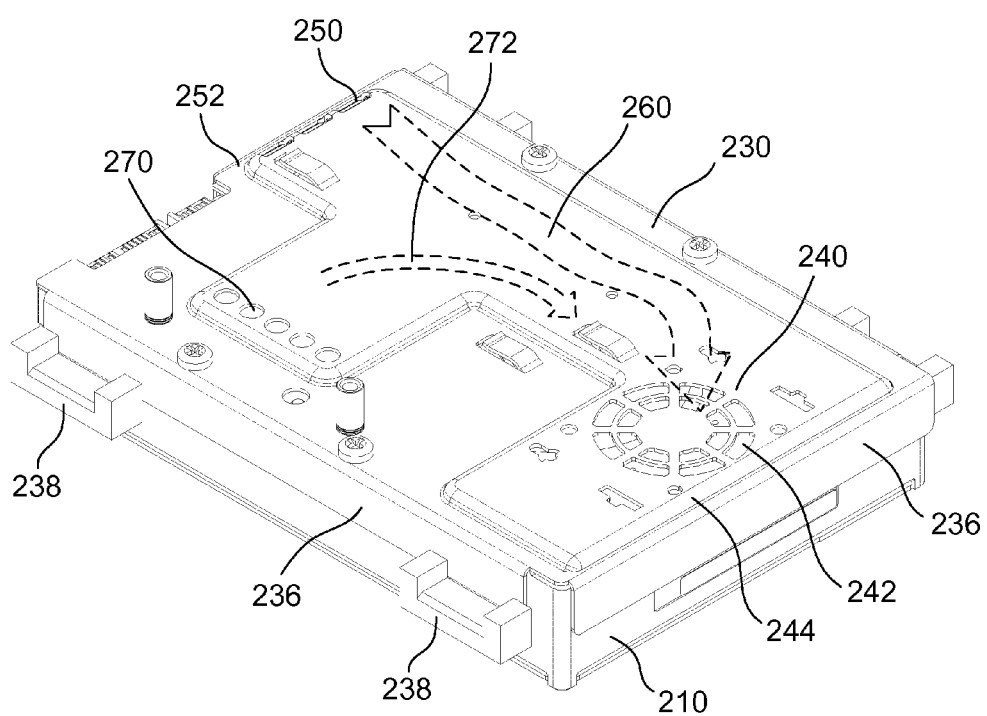
FIG. 2 is a perspective view of an electrically conductive shield attached to a disk drive base, according to an embodiment of the present invention.

FIG. 2 is a perspective view of an electrically conductive shield 230 attached to a disk drive base 210, according to an embodiment of the present invention. The electrically conductive shield 230 includes a fan mounting surface 240 having a fan duct opening 242 disposed adjacent an upper end 244 of the electrically conductive shield 230. The electrically conductive shield 230 also includes a lower air inlet opening 250 disposed adjacent a lower end 252 of the electrically conductive shield 230. In the embodiment of FIG. 2, the electrically conductive shield 230 forms a continuous internal air passageway 260 from the lower air inlet opening 250 to the fan duct opening 242. Note that in FIG. 2, an arrow depicting the internal air passageway 260 is drawn in dashed (hidden) lines because the internal air passageway 260 is disposed between the electrically conductive shield 230 and the disk drive base 210. Even in regions where the internal air passageway 260 is disposed immediately between the electrically conductive shield 230 and the disk drive printed circuit board, the internal air passageway 260 is also disposed generally between the electrically conductive shield 230 and the disk drive base 210.

Preferably, the continuous internal air passageway 260 defines an internal passageway height in the range 1 mm to 10 mm. In the embodiment of FIG. 2, the internal passageway height is measured normal to the electrically conductive shield 230, for example between the electrically conductive shield 230 and the disk drive base 210. In some regions the internal passageway height may be measured normal to the electrically conductive shield 230, between the electrically conductive shield 230 and the disk drive printed circuit board. Note that, in the embodiment of FIG. 2, other regions of the electrically conductive shield 230 are depicted as being flush with (e.g. contacting) the disk drive base 210 rather than being stood off by the internal passageway height, to enhance heat conduction from the disk drive base 210 into the electrically conductive shield 230.

Optionally, a fan may be attached to the fan mounting surface 240, for example for a disk drive that requires relatively greater heat dissipation, such as a fully populated disk drive. However, if an external structure gives the disk drive base 210 a vertical orientation with respect to gravity, then free convection will occur in the continuous internal air passageway 260, and that free convection may provide adequate cooling for a disk drive that requires relatively lesser heat dissipation (e.g. certain depopulated disk drives). For example, where the information storage device is a 5400 RPM, 3.5" form factor disk drive that consumes less than 10 Watts power, preferably an external structure will be designed and provided to give the disk drive base 210 a vertical orientation with respect to gravity, and no fan will be attached to the fan mounting surface. Note that where the disk drive base 210 is in a vertical orientation with respect to gravity, the continuous internal air passageway 260 will also be oriented vertically so that the aforementioned internal passageway height will be measured in a generally horizontal direction.

In the embodiment of FIG. 2, the electrically conductive shield 230 further optionally includes a bridge controller cooling inlet opening 270 disposed adjacent the bridge controller printed circuit board (e.g. bridge controller printed circuit board 140). The electrically conductive shield 230 forms a continuous internal air passageway 272 leading generally upward from the bridge controller cooling inlet opening 270 to the fan duct opening 242. In this regard, being continuous doesn't require an absence of abrupt changes in direction; rather being continuous merely connotes that the internal air passageway is unbroken and that air can flow all the way through it. If an external structure gives the disk drive base 210 a vertical orientation with respect to gravity, then free convection will occur in the continuous internal air passageway 272, and that free convection may provide cooling for the bridge controller printed circuit board 140 as well as for the disk drive.

In the embodiment of FIG. 2, the conductive shield 230 includes peripheral capacitive flanges 236, each of which at least partially overlaps the periphery of the disk drive base 210. Such overlap may provide a desirable level of capacitive electrical coupling between the electrically conductive shield 230 and the disk drive base 210, in lieu of or in addition to direct electrical coupling (e.g. via screws). The peripheral capacitive flanges 236 may also include a plurality of projections 238 for mounting the disk drive base 210 and the electrically conductive shield 230 into an exterior housing (e.g. exterior housing 300 of FIG. 3).

Figure 3:
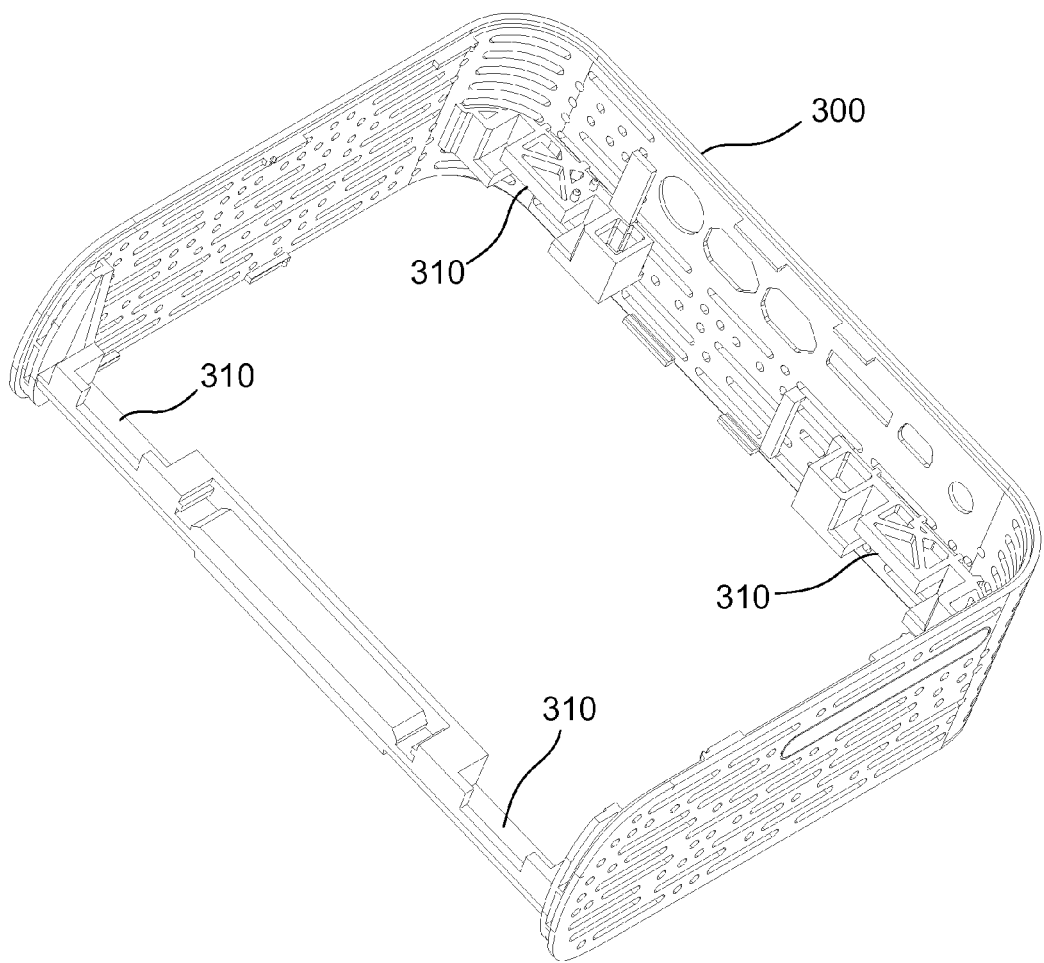
FIG. 3 is a perspective view of a disk drive support structure, according to an embodiment of the present invention.

FIG. 3 is a perspective view of a disk drive support structure 300, according to an embodiment of the present invention. In the embodiment of FIG. 3, the disk drive support structure 300 may include a plurality of receptacles 310 to receive projections from the electrically conductive shield (e.g. projections 238 shown in FIG. 2), and thereby give the disk drive base 210 a vertical orientation. For example, FIG. 4 is a perspective view of an information storage device 400, having a disk drive support structure 300 that maintains an electrically conductive shield 430 in a vertical position, according to an embodiment of the present invention.

Figure 4:
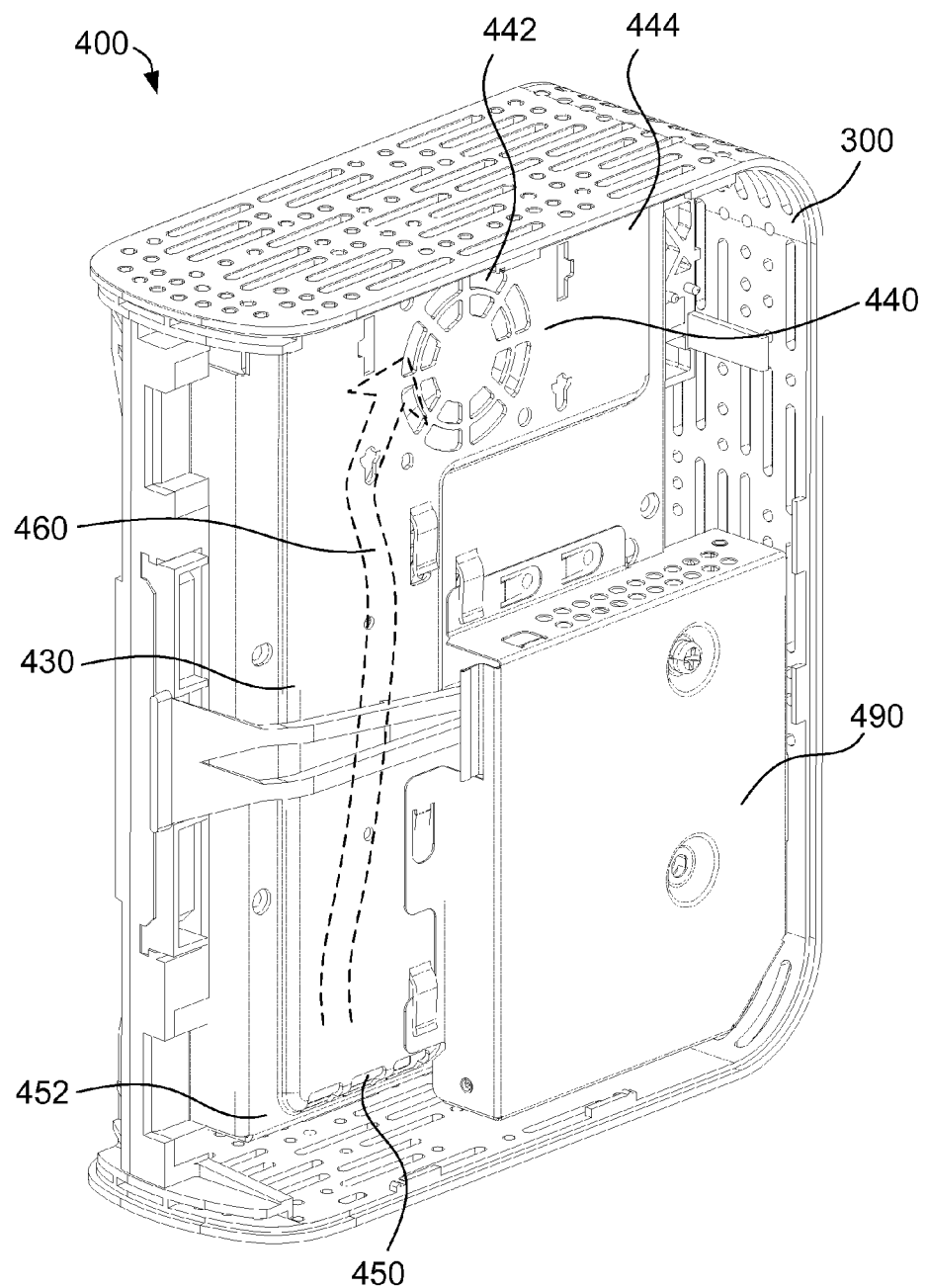
FIG. 4 is a perspective view of a disk drive support structure maintaining a disk drive in a vertical position, according to an embodiment of the present invention.

In the embodiment of FIG. 4, the electrically conductive shield 430 includes a fan mounting surface 440 having a fan duct opening 442 disposed adjacent an upper end 444 of the electrically conductive shield 430. The electrically conductive shield 430 also includes a lower air inlet opening 450 disposed adjacent a lower end 452 of the electrically conductive shield 430. In the embodiment of FIG. 4, the electrically conductive shield 430 includes a continuous internal air passageway 460 from the lower air inlet opening 450 to the fan duct opening 442. Note that in FIG. 4, an arrow depicting the internal air passageway 460 is drawn in dashed (hidden) lines because the internal air passageway 460 is disposed beneath the electrically conductive shield 430. In FIG. 4, the information storage device 400 is also depicted to include a conductive bridge controller enclosure 490.

Figure 5:
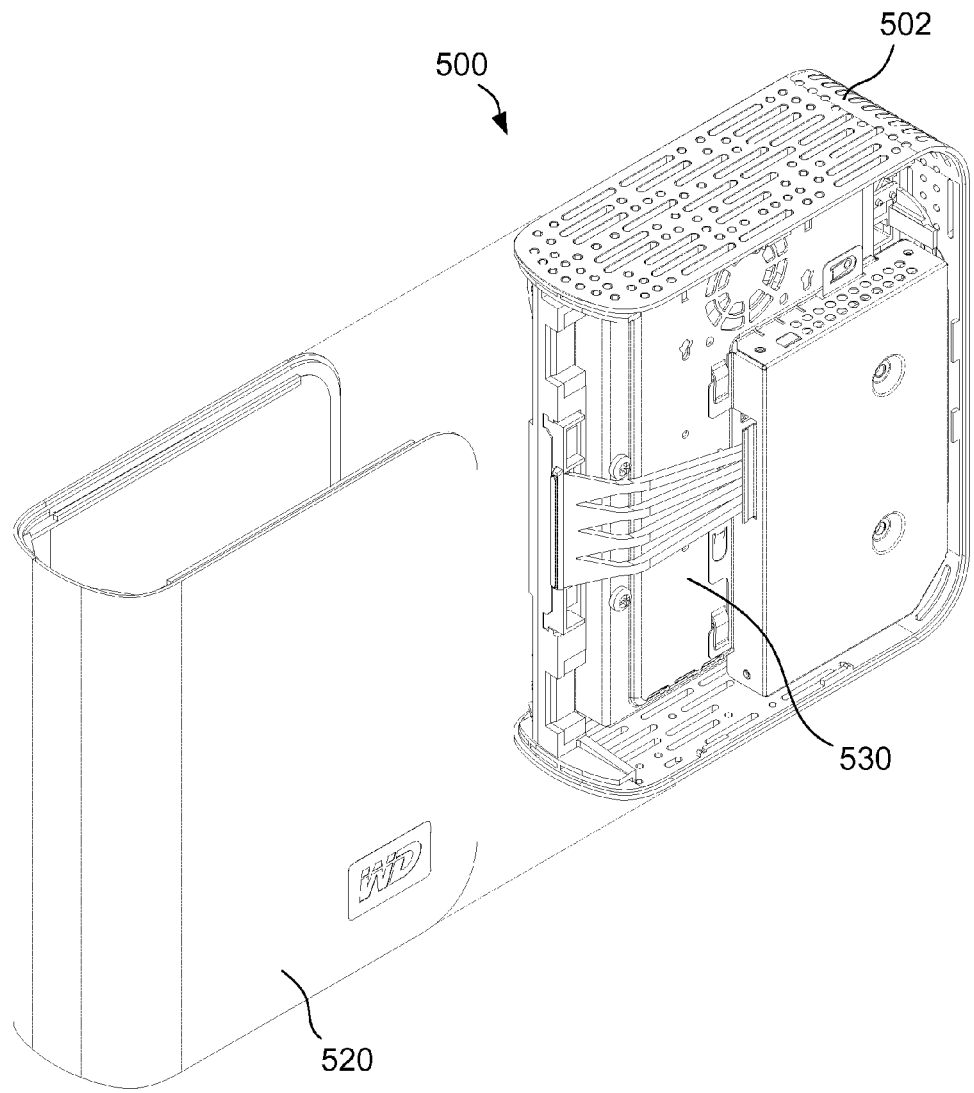
FIG. 5 is a perspective view of a disk drive support structure maintaining a disk drive in a vertical position, according to another embodiment of the present invention.

FIG. 5 is a partially exploded view of an information storage device 500, according to an embodiment of the present invention. The information storage device 500 includes a housing 502 and a cover 520. The housing 502 and the cover 520 may comprise injection molded plastic, for example. In the embodiment of FIG. 5, no fan is mounted to the electrically conductive shield 530, while the housing 502 maintains the electrically conductive shield 530 in a substantially vertical position to enhance free convection. This design may allow the electrically conductive shield 530 to optionally function in both free and forced convection configurations, and thereby be a practical and cost-effective solution for a broader range of required disk drive heat dissipation requirements.

Figure 6:
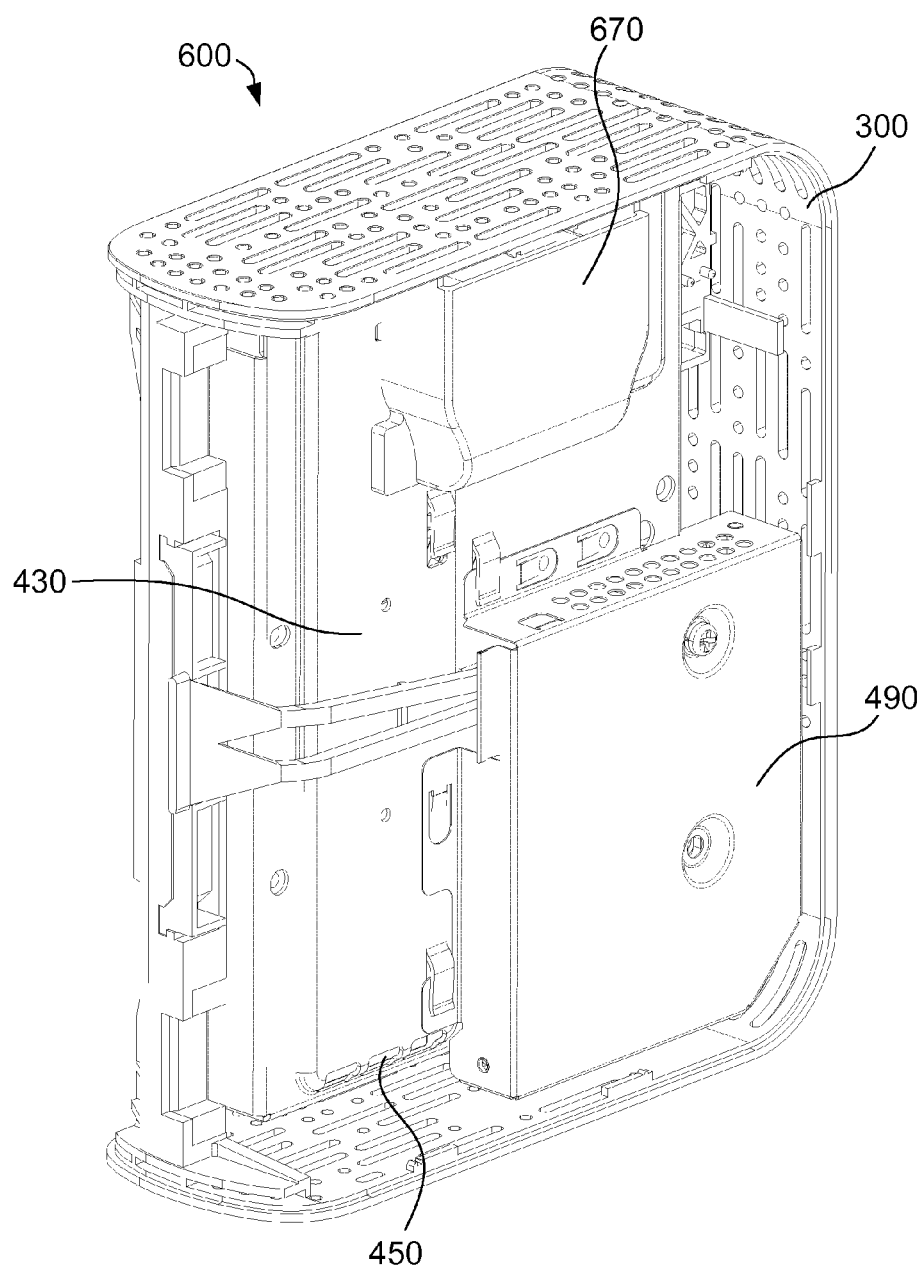
FIG. 6 depicts the disk drive support structure of FIG. 4, except with an optional fan and fan duct attached.
Figure 7:
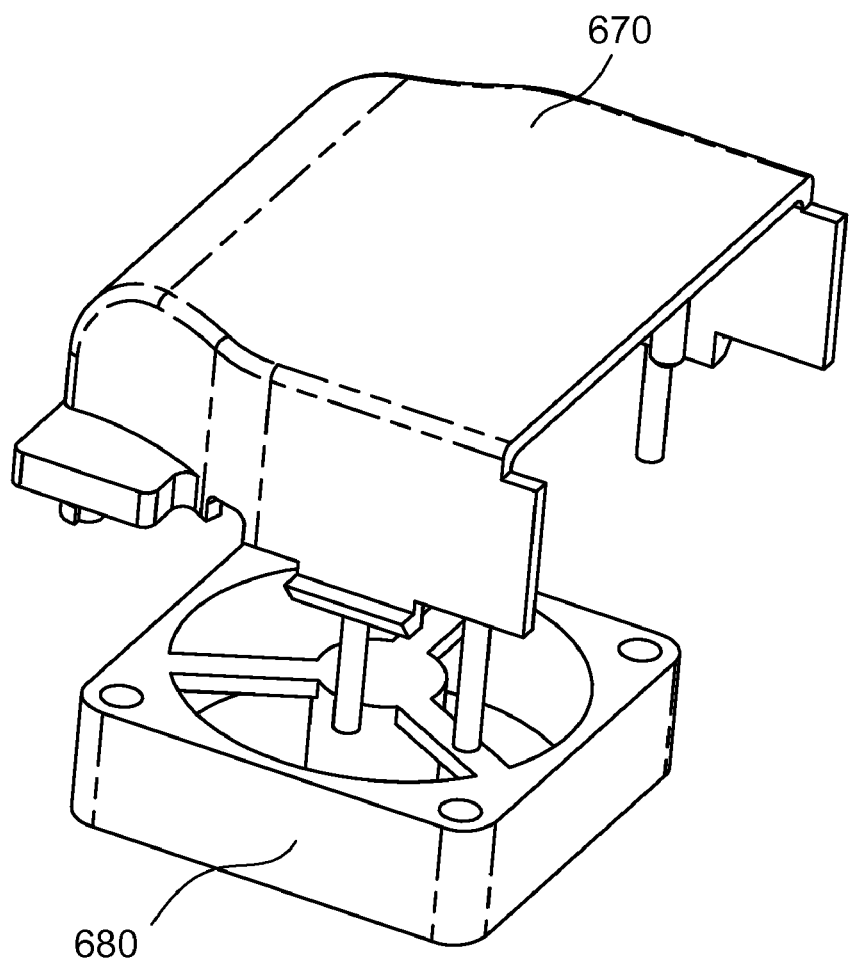
FIG. 7 is a exploded top perspective view of the optional fan and fan duct of FIG. 6.
Figure 8:
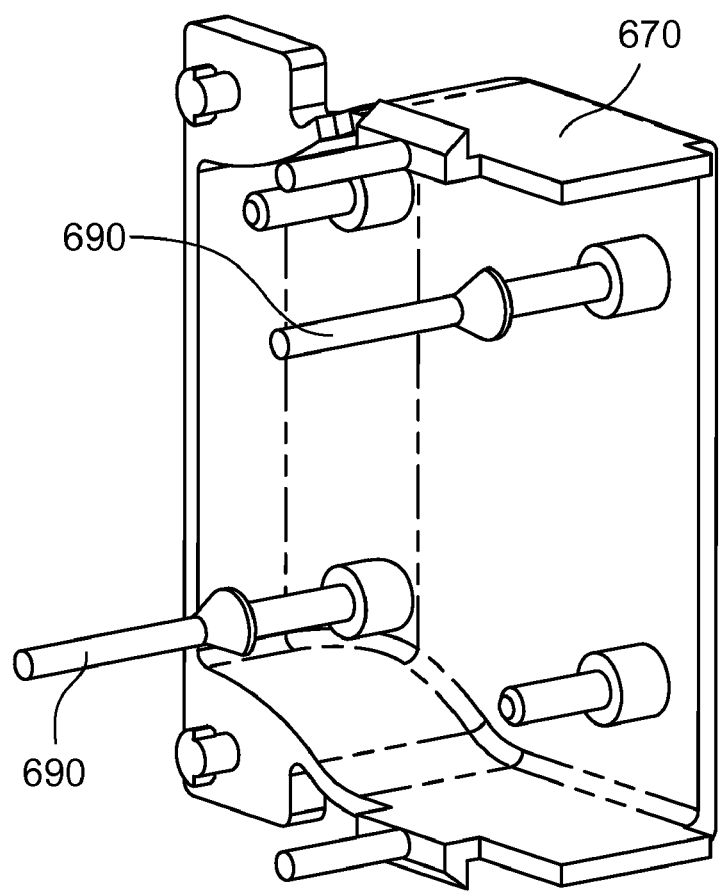
FIG. 8 is a side perspective view of the optional fan duct of FIG. 7.

For example, FIG. 6 depicts an information storage device 600 like that of FIG. 4, except with an optional fan and fan duct 670 attached. For example, where the information storage device 600 includes a disk drive that consumes more than 10 Watts power (e.g. >5400 RPM, 3.5" form factor disk drive), a fan is preferably attached to the fan mounting surface 440 of the electrically conductive shield 430. Note that the fan is not visible in the view of FIG. 6, because it is obscured by the fan duct 670. FIG. 7 is a exploded top perspective view of the optional fan 680 and fan duct 670 of FIG. 6. FIG. 8 is a side perspective view of the optional fan duct 670 of FIG. 7. The fan duct 670 of FIG. 8 may include elastomeric fasteners 690 to facilitate attachment of the fan 680 to the electrically conductive shield 430 via holes through the fan mounting surface 440 (adjacent the fan duct openings 442).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. An information storage device comprising:
a disk drive including a disk drive base having a first side and an opposing second side, a spindle attached to the disk drive base, a disk attached to the spindle, a disk drive cover attached to the first side of the disk drive base to enclose the spindle and the disk, and a disk drive printed circuit board attached to the disk drive base and disposed adjacent the second side of the disk drive base;
a disk drive support structure adapted to maintain the second side of the disk drive base in a substantially vertical position with respect to gravity; and
an electrically conductive shield attached to the disk drive base, the electrically conductive shield being disposed adjacent to and along the second side of the disk drive base and overlying the disk drive printed circuit board, the electrically conductive shield including:
a fan mounting surface having a fan duct opening disposed adjacent an upper end of the electrically conductive shield, and
a lower air inlet opening disposed adjacent a lower end of the electrically conductive shield;
wherein the electrically conductive shield is spaced from the second side of the disk drive base to form a continuous internal air passageway from the lower air inlet opening to the fan duct opening thereby creating a path for free convective air circulation through the passageway, and wherein the information storage device includes no fan attached to the fan mounting surface.

2. The information storage device of claim 1 wherein the disk drive printed circuit board includes a Serial Advanced Technology Attachment (SATA) connector.

3. The information storage device of claim 1 wherein the continuous internal air passageway defines an internal passageway height in the range 1 mm to 10 mm.

4. The information storage device of claim 1 wherein the disk drive is a 3.5" form-factor disk drive, and wherein the electrically conductive shield comprises sheet metal having a thickness in the range 0.8 mm to 1.6 mm.

5. The information storage device of claim 1 further comprising a bridge controller printed circuit board adjacent the electrically conductive shield, and wherein the electrically conductive shield further includes a bridge controller cooling inlet opening disposed adjacent the bridge controller printed circuit board.

6. The information storage device of claim 5 wherein the bridge controller printed circuit board includes a Serial Advanced Technology Attachment (SATA) controller.

7. The information storage device of claim 5 wherein the bridge controller printed circuit board includes a Universal Serial Bus (USB) connector.

8. The information storage device of claim 5 wherein the bridge controller printed circuit board includes an IEEE 1394 connector.

9. The information storage device of claim 5 wherein the bridge controller printed circuit board includes an Enhanced Serial Advanced Technology Attachment (eSATA) connector.

10. The information storage device of claim 5 wherein the electrically conductive shield forms a continuous internal air passageway leading generally upward from the bridge controller cooling inlet opening to the fan duct opening.

* * * * *